INVENTORS: G.W. DICK
W. D. FARMER
BY: Charles Scott Phelan
ATTORNEY

United States Patent Office 3,438,008

Patented Apr. 8, 1969

3,438,008

MAGNETIC THIN FILM STORAGE NETWORK FOR SHIFT REGISTERS AND OTHER LOGIC

George W. Dick, Cooksville, Ontario, Canada, and Wayne D. Farmer, Plainfield, N.J., assignors to Bell Telephone Laboratories, Incorporated, New York, N.Y., a corporation of New York Filed Mar. 8, 1966, Ser. No. 532,637

Int. Cl. G11b *5/62*

U.S. Cl. 340—174 25 Claims

This invention relates to an information storage network and particularly to such networks which employ magnetic thin films.

All-magnetic storage networks are known in the art and examples thereof are shown in the G. W. Dick Patent 3,192,511 for magnetic core arrangements and in the R. M. Wolfe Patent 3,175,185 for magnetic thin film systems. Such networks have been used, for example, in shift registers and combinatorial logic arrays. Furthermore, the teaching in the G. W. Dick patent application Ser. No. 473,760, filed July 21, 1965, and in a similar paper entitled, "Symmetrical All-Magnetic Shift Registers," by G. W. Dick and appearing on pages 4.8–1 through 4.8–9 of Proceedings of the 1965 Intermag Conference, April 1965, Washington, D.C., show that certain basic three-phase types of storage networks using either cores or films can be expanded to higher phase order systems for achieving improved gain and speed characteristics. However, implementation of the basic all-magnetic networks, and of higher phase order members of such information storage network families, has been impeded by certain design and manufacturing considerations.

Some such considerations include, for example, problems of making electrical connections to thin film circuits without duly stressing the thin films. Another type of problem includes considerations in providing appropriate magnetic device winding turns ratios for different types of cores to realize sufficient gain to overcome inherent circuit losses. Because of the aforementioned types of problems and because prior art information storage networks are usually characterized by relatively high ratios of numbers of magnetic devices per information bit, the over-all costs both of all-magnetic networks and of other types of magnetic networks are generally at levels which are considered to be quite high.

It is therefore one object of the present invention to improve magnetic storage networks.

It is another object to improve the ratios of magnetic devices to information bits in magnetic information storage networks.

A further object of the invention is to reduce the cost of magnetic storage networks.

Still another object is to reduce some of the complexities involved in the design and manufacture of magnetic information storage networks.

These and other objects of the invention are realized in a $n$-phase information storage network embodiment wherein a plurality of magnetic storage devices with anisotropic characteristics are coupled in a series to a common electric circuit wire so that a given information-representative magnetic condition can be shifted along the series of storage devices in the direction of the wire in response to the recurrent application of $n$-phase drive signals to the storage devices. Also provided in the illustrative embodiment are $n-1$ resistor connections wherein resistors provide electric circuit loading to permit rapid switching of the devices in response to the $n$-phase drive signals.

It is one feature of the invention that the anisotropic character of the devices provides magnetic isolation of signal transfer effects without the necessity for externally supplying energy to hold buffer devices in a certain magnetic condition.

It is a further feature that the anisotropic character of the storage devices is utilized to permit propagation buffer devices independently to store individual information bits so that $n-1$ different information bits can be stored in $n$ of the storage devices.

It is another feature that the cooperative arrangement of resistor connections and anisotropic magnetic devices makes possible the convenient utilization of modern batch manufacturing techniques such as, for example, printed circuit techniques. Thus extensive circuit systems can be manufactured at relatively low cost.

A further feature is that the use of anisotropic magnetic elements contemplates taking advantage of the inherent gain thereof and thereby eliminating the necessity for complex device winding plans which are difficult to design and at least equally difficult to manufacture.

Still another feature of the invention is that the magnetic devices are interconnected in the storage network in a fashion which permits each of the multiphase drive signals utilized for the network to have the same low duty cycle, i.e., $1/n$, so that the drive signal source can be a relatively simple and inexpensive circuit.

Yet another feature is that the devices of the network are operated in response to signal transfer currents having a relatively large and noncritical magnitude range so that the storage network is characterized by liberal operating margins.

A more complete understanding of the invention may be obtained from the following detailed description when taken together with the appended claims and the attached drawing in which:

Figure 1:
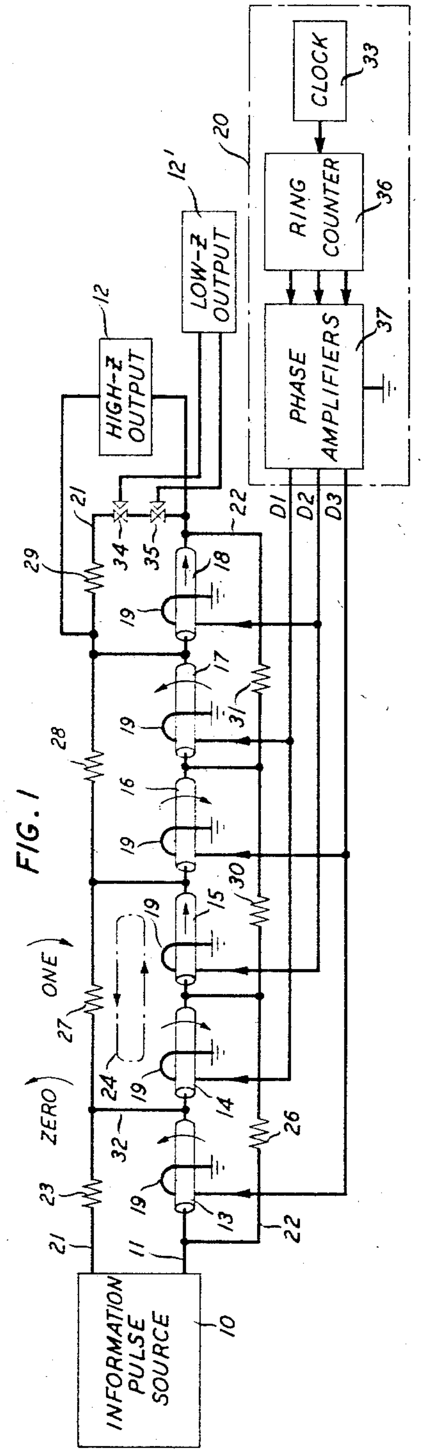
FIG. 1 is a diagram of a magnetic shift register utilizing information storage networks in accordance with the present invention.

FIG. 1 illustrates a three-phase magnetic shift register utilizing information storage networks in accordance with the present invention. An information pulse source 10 supplies binary coded information pulses to a continuous wire 11 that extends an electric circuit path continuously from the source 10 to any convenient output circuit 12. It will be shown, however, that the pulses from source 10 are not coupled immediately to the output circuit 12 in the manner that one might expect for conventional electric circuits because the transmission of such pulses is dependent upon the steps of operation of the information storage networks in the shift register.

A plurality of magnetic storage devices 13 through 18, inclusive, are coupled in a series along the wire 11 between the source 10 and the output circuit 12. Each such magnetic device operates independently of the others although all of them are advantageously segments of a substantially continuous coating of anisotropic magnetic material on the wire 11. Such an arrangement of devices on a wire is known in the art as taught, for example, in the aforementioned Wolfe patent. Briefly, however, a .005 inch diameter beryllium-copper wire is continuously plated to a thickness of about 1 micron with a nonmagnetostrictive composition of nickel-iron material having anisotropic magnetic characteristics as is known in the art. The plated material has an easy axis of magnetization which is circumferential with respect to the wire and wherein it has remanent stable magnetization states of opposite polarity between which it is switched by the application of magnetomotive forces of appropriate magnitude. The plating material also has a hard direction magnetic axis which extends in the same direction as the length of wire 11, but the magnetization is unstable in the hard direction because it falls back to the easy direction in the absence of a holding force.

Single-turn drive straps 19 are utilized for applying multiphase drive signals from a drive source 20, which will be described, for driving the magnetization in the magnetic devices 13 through 18 into the hard direction. The switching of a storage device from the easy direction to the hard direction induces a current in wire 11 which tips the magnetization of an adjacent device from which a drive signal is simultaneously removed so that the adjacent device is caused to assume an easy direction magnetization polarity which is the same as the condition from which the first-mentioned device was just driven. This type of operation of such film devices has been described in the aforementioned Wolfe patent and is sometimes called the fall back method for setting a film element to a binary signal state. The operation is achieved by utilizing drive signals that are advantageously of about 1.5 amperes in magnitude for producing a hard direction field $H_t$ that is approximately twice the internal anisotropy field $H_k$ at the center of the single-turn drive straps. $H_k$ is the field that would otherwise be required to reverse the easy direction polarity of magnetization. The $H_t$ field size is proportioned with respect to the strap width and spacing from wire 11 so that the field is approximately $H_k$ at the strap edges and falls off as rapidly as possible beyond the strap edges. This reduces the noise effects produced by film portions beyond the strap that are never fully driven to the hard direction of magnetization.

The field required for tipping the magnetization as hereinbefore described is advantageously approximately only ten percent of the $H_k$ field. However, the field produced by tipping current induced in wire 11 by driving a device to its hard direction is advantageously approximately sixty percent of the $H_k$ field so the storage device is said to possess inherent gain. Such gain is utilized in the present invention to overcome circuit losses and eliminate the need for inserting gain producing devices such as amplifiers or transformers with appropriate turns ratios.

The shift register of FIG. 1 also includes $n-1$ series resistor connections between the source 10 and the output circuit 12 where $n$ is the number of drive phases in the drive signal applied by the source 20. For the embodiment of FIG. 1 $n$ is equal to 3. Consequently, two series resistor connections 21 and 22 are provided. Each such series resistor connection has at least one resistor for each $n-1$ of the magnetic storage device segments coupled to the wire 11. In general terms, each resistor shunts a different $n-1$ segments except at the ends of the wire 11 where certain of the resistors shunt a lesser number of segments. Thus, considering the segments and the individual resistors of each of the resistor connections in their respective sequences extending from source 10 to output circuit 12, the first resistor of each resistor connection shunts a different number of the first $n-1$ magnetic segments coupled to the wire 11. Such different number is in the range of 1 to $n-1$, where $n$ again is the number of drive phases. Each of the other resistors of the same resistor connection shunts different succeeding groups of $n-1$ segments in the aformentioned sequence; and if there is any remaining segment group having less than $n-1$ segments, an additional resistor is included in the resistance connection to shunt them. Thus, in the three-phase circuit of FIG. 1 a first resistor 23 in the connection 21 shunts the single element 13 while the first resistor 26 in the connection 22 shunts both of the segments 13 and 14. Each of the resistors 27 and 28 in the connection 21 shunts two additional segments, i.e., segments 14 and 15 and the segments 16 and 17, respectively. The last resistor 29 of the connection 21 shunts only the last segment 18. Similarly resistors 30 and 31 in the connection 22 shunt the segment pairs 15, 16 and 17, 18, respectively.

Input source 10 is coupled between the wire 11 and any resistor connection wherein the first resistor shunts less than $n-1$ of the magnetic device segments. Thus, in FIG. 1 the source 10 is coupled between the wire 11 and the connection 21 wherein the first resistor 23 shunts only the single input segment 13, i.e., $n-1$ in this embodiment being two. All of the resistors in the various resistive connections, e.g., connections 21 and 22, have substantially the same resistance, and the total effective resistance of any resistive shunt including source 10 is adjusted to be approximately the same as the resistance of other shunts. For example, in FIG. 1 source 10 may comprise the total resistance of a shunt so that resistor 23 could be eliminated as happens when source 10 is a plurality of sources in a fan-in network to be described. Alternatively, the effective resistance of source 10 is made much smaller than the resistance of any one of the aforementioned resistors so that it does not significantly alter the uniform resistance patterns for the over-all circuit. If source 10 has an output impedance that is significantly larger than the desired unit resistance of the pattern, then the output of source 10 is applied across the device 13, and resistor 23 is made to shunt both the source and device 13. A uniform resistance pattern is necessary to have a symmetrical organization for achieving maximum bit rate of operation and maximum hardware economy, as will be subsequently discussed in greater detail.

Output circuit 12 is coupled across the output segment 18 in what has been found to be an advantageous arrangement for output circuits with relatively high input impedance, i.e., an input impedance of four times higher than the resistance of one of the resistors. However, for output circuits with relatively low input impedance, i.e., of the same order of magnitude as one of the resistive circuit resistors, the output is connected in series with the one such resistor that shunts only the last storage device so that the output sees the signals from only that device. The corresponding resistor is modified to maintain uniformity of the resistance magnitude pattern. For example, such a low-impedance output circuit 12' is connectable between circuit points 34–35 in substitution for the lead wire therebetween. Appropriate change in the size of resistor 29 is, of course, made as outlined previously in connection with source 10 and resistor 23.

Connections such as the lead 32 between the wire 11 and the resistive connection 21 are advantageously accomplished by means of wire tabs having a much smaller diameter than the diameter of the wire 11 so that the mechanics of making an electric circuit connection to such wire do not impose significant mechanical strain on any magnetic storage element. More discussion of these tab connections will be presented in connection with FIGS. 6 and 7.

Figure 3:
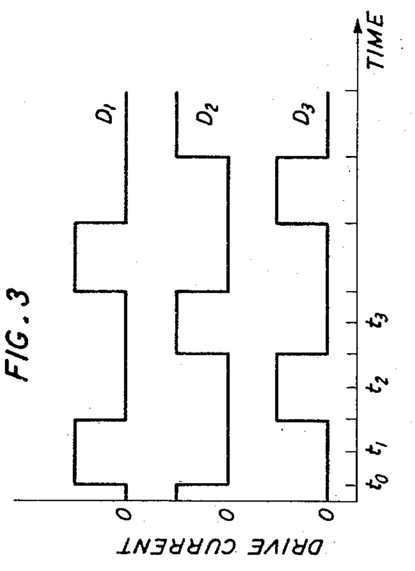

The shift register of FIG. 1 is advantageously organized in a symmetrical manner to achieve maximum bit rate handling capacity and to achieve relatively simple register and driver hardware design. A symmetrical shift register of the type illustrated operates in the megacycle bit range for binary coded information bits supplied from the pulse source 10. This bit rate can, of course, be multiplied by time division multiplexing a plurality of such registers to operate from a single source 10. The previous reference to symmetrical organization indicates that individual magnetic device circuits and electric coupling circuits are essentially the same for each phase of storage network operation. That is, each transfer of information from one storage device to another involves a transfer network configuration that is the same throughout the register. It also indicates that the drive pulses supplied by drive source 20 are identical for each phase of operation as illustrated in FIG. 3, and each drive pulse occupies $1/n$ of a total drive period for an $n$-phase system.

The aforementioned type of drive signal is readily achieved, for example, by utilizing a clock source 33 for driving a ring counter 36 that supplies output pulses in different phases through phase amplifiers 37 to the drive circuits D1, D2, and D3, respectively. Clock 33 is advantageously an astable multivibrator, and ring counter 36 is a chain of flip-flop circuits driven in tandem from clock 33 and each having an output feedback connection through a logical NOR circuit to the same input which is driven from the clock 33. The flip-flop circuits are thus set and reset at equally spaced time intervals for providing three adjacent drive pulses in each complete three-phase cycle as shown in FIG. 3. The phase amplifiers 37 provide any amplification required to achieve the drive current level that is required to accomplish switching of magnetic elements from their easy to their hard direction of magnetization. All circuits of source 20 are well known in the art.

The basic operation of a storage network in accordance with the present invention can be considered in the context of three adjacent magnetic storage devices of the type employed in FIG. 1. These three are characterized as a group as a single storage network and individually as a transmitting device, a receiving device, and a buffer device. Shuttle currents from more than one such network may simultaneously flow in a single buffer device as will appear from subsequent discussion; and higher phase order circuits will include additional buffer devices; but the basic network operation is the same for all systems. For example, in FIG. 1 the drive phase signal D1 is applied to the device 14, which is the transmitting device; and the resulting induced current flows in a loop 24 including the resistor 27 and the portion of wire 11 which is coupled to the transmitting device 14 and the receiving device 15. Drive signal D2 is being removed from receiving device 15 as the induced current flows therethrough to tip its magnetization. Device 13 is at the same time a buffer device because it has no steady or transient drive signal from source 20.

In accordance with the invention the induced current, i.e., the information transfer current, from the transmitting device in a storage network flows in $n=2$ coupling loops which link both the transmitting and receiving devices, and the resistances therein provide the loading needed to permit the development of sufficient potential across the storage device segments to assure switching. In the three-phase circuit of FIG. 1, only a single such resistive coupling loop is provided. A portion of the induced current from the transmitting device does, however, flow in at least one additional path which includes the buffer device 13 and the resistor 26. But the device 13 can receive and store information only when the drive signal D3 is removed, and this operation does not occur during the interval under considerttion when the drive signal D1 is present. Accordingly, the portion of the induced current flowing in the loop with resistor 26 simply shuttles the device 13.

One factor, though usually not the controlling one, influencing the minimum resistance magnitude for resistor 26 is its influence on the buffering function. The resistance of resistor 26 must be large enough so that the loop current shuttling device 13 has insufficient magnitude to accomplish permanent switching of flux therein from one easy direction polarity to the other. Consequently, and in accordance with the present invention, the device 13, which is at the time of the D1 signal functioning as a buffer device, can independently store an individual information bit while at the same time performing its buffering function during the D1 drive signal phase. All other resistors in each of the resistive connections 21 and 22 have a similar minimum resistance limitation imposed upon them in accordance with the requirement for symmetrical organization of the circuit of FIG. 1, because each shunts a transmitting and a buffering device at some time during a cycle of operation. Another resistance size consideration involving the buffering function is that coupling loop resistance should be at least twice the resistance of one storage device wire portion and with its coupled magnetic segment so that any tendency for shuttling currents from different simultaneously transmitting devices to cause interference will be minimized.

A maximum limitation is also imposed upon the magnitude of the coupling resistors, such as resistor 26, utilized in the resistive connections in information storage networks of the invention. Thus, the resistance of each such resistor must be low enough so that the information transfer current flowing between transmitting and receiving magnetic devices, i.e., the aforementioned current in the loop 24 including resistor 27, is large enough to accomplish the desired magnetization tipping in the receiving device. In one circuit that was actually operated, the coupling resistors were advantageously assigned resistance values of about 5 ohms in a three-phase circuit operating at approximately a 3 megacycle bit rate for information bits supplied from source 10.

Another factor influencing the selection of resistors for the resistive connections is the need to minimize the effective damping by the resistances shunting a receiving magnetic device. When the drive signal from the receiving device is removed, the receiving device induces a current in opposition to the transfer current produced by the transmitting device. A portion of this opposing current is established before the final magnetization state of the receiving element is determined, i.e., before the hard direction field $H_t$ resulting from the drive signal decreases below the $H_k$ field level. The opposing current in effect reduces the net tipping current in the receiving device; and if the opposing current is allowed to become excessive in magnitude it will reduce the amount of flux set into the receiving device. The magnitude of this opposing, or damping, current is determined by the total effective shunt resistance across the receiving device. Thus, the lowest values of resistance permissible for the coupling network must prevent the damping currents from excessively reducing flux switched into the receiving devices. For example, the receiving device 15 is, from an impedance standpoint, shunted by both of the resistors 27 and 30 which the device 15 sees in a parallel-connected configuration. If the parallel combination of these $n—1$ damping resistors presents an excessively low resistance across the receiving device, the tipping current in the device would be unable to set sufficient flux to preserve the information significance thereof through a plurality of transfers. It is to be noted, however, that it has been found that the aforementioned upper and lower limiting factors upon resistances of resistors in the connections 21 and 22 for the three-phase circuit of FIG. 1, and for other embodiments to be described, permitted a tolerance range for such resistances wherein the maximum resistance could be as much as four times as large as the minimum resistance of the range while still providing satisfactory circuit operation.

It has been noted that when the buffer loop current is held to a sufficiently low level the buffer device can store an independent information bit while performing its buffer function. It should be further noted in this connection that this type of operation eliminates the need to apply a holding drive signal for maintaining a buffering device in some predetermined magnetic condition to prevent spurious propagation of information signal conditions as generally characterizes prior art magnetic shift registers. Since no such holding signal is required in the storage networks of the present invention, the power requirements for the drive signal source 20 are correspondingly reduced and the information packing capabilities of the network are correspondingly increased. Thus, for an $n$-phase storage network each $n$ storage devices can store $n-1$ independent information signal bits since only one buffer device is required for each group of $n$ storage devices.

Figure 2:
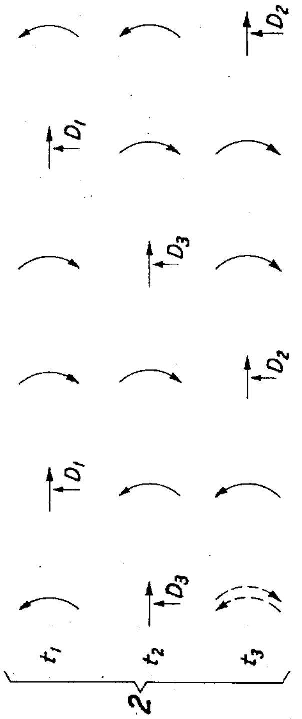
FIGS. 2 and 3 are diagrams illustrating the operation of the circuit of FIG. 1.

The full three-phase operation of the circuit of FIG. 1 may be observed by considering FIGS. 1, 2, and 3 in conjunction with one another. In considering this operation, a counterclockwise easy direction magnetization is considered to represent a binary ZERO information bit, and a clockwise direction of magnetization is considered to represent a binary ONE information bit. An assumed state of initial conditions is indicated by the arrows on the magnetic devices in FIG. 1. Thus, initially the devices 13 and 17 are in the ZERO state, devices 14 and 16 are in the ONE state, and devices 15 and 18 are held in their hard direction of magnetization by the drive signal D2 as indicated by the horizontal arrow directed to the right of each of the latter two devices in FIG. 1. These initial conditions prevail just prior to the time $t_0$ in FIG. 3. The drive signals in one embodiment advantageously had a magnitude of 1.5 amperes with rise and fall times of approximately 15 nanoseconds. The frequency of each drive phase signal must, of course, correspond to the bit rate of input signals from source 10.

FIG. 2 is an arrow diagram illustrating the information signal conditions prevailing in the magnetic devices of FIG. 1 at the times $t_1$, $t_2$, and $t_3$ which occur approximately midway in each of the three drive phase intervals D1, D3, and D2, respectively. The arrows in the diagram of FIG. 2 are aligned immediately below the storage devices of FIG. 1 to which they correspond. At time $t_0$ drive signal D2 is relaxed, and signal D1 is applied so that devices 14 and 17 are driven to their hard direction of magnetization thereby generating transfer loop currents which tip the receiving devices 15 and 18 to the same easy direction conditions of magnetization which had theretofore prevailed in the transmitting devices, 14 and 17, respectively. This change in state of two transmitting and two receiving devices is indicated in FIG. 2 wherein it can be seen by comparing the time $t_1$ diagram with the condition-indicating arrows in FIG. 1 that the information states in buffer devices 13 and 16 have not been changed. Thus, the binary ONE signal conditions that were in the devices 14 and 17 have been shifted toward the output circuit 12 by one magnetic device position in the device sequence along common wire 11.

Subsequently, drive signal D3 is applied and drive signal D1 is relaxed to produce the new information states indicated in the time $t_2$ diagram of FIG. 2. Now the binary ZERO condition from the device 13 and the binary ONE condition from the device 16 are moved to the right by one device position, as shown in FIG. 2, while the conditions of the devices 15 and 18, which are in this phase serving as buffer devices, remain unchanged. A similar type of operation takes place during the third phase of operation so that at time $t_3$ the binary ONE which had been in device 15 at time $t_2$ and the binary ZERO which had been in device 18 at time $t_2$ are now shifted toward output circuit 12 by the application of drive signal D2 and the simultaneous relaxation of drive signal D3. The condition of device 13 is ambiguously indicated by two dotted arrows at the left of that $t_3$ diagram in FIG. 2 to indicate that this device may go to either the ONE or the ZERO state depending upon which type of bit is supplied by source 10 when drive signal D3 is relaxed.

Considering all of the previously mentioned information transfers in a more or less spatial sense within any group of $n$ adjacent magnetic devices, it will be seen that the devices of the group are successively driven in a sequence which is the reverse of the sequence in which information moves along the direction of the common wire 11. For example, devices 17, 16, and 15 are driven in that order to transfer information bits from them to devices 18, 17, and 16 in one drive cycle. Three such cycles move a bit from device 15 and 16, 16 to 17, and 17 to 18.

Figure 4:
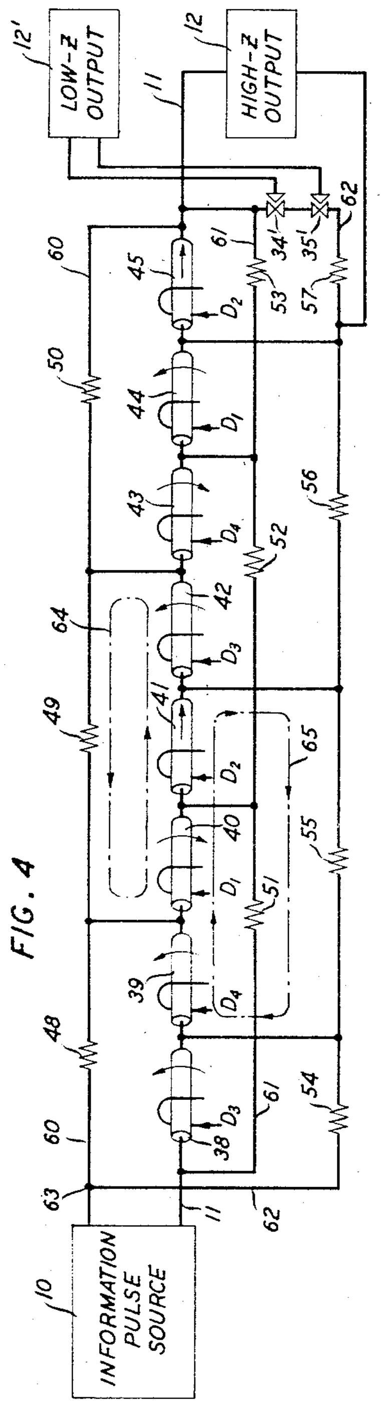
FIG. 4 is a modified form of the shift register type illustrated in FIG. 1.

FIG. 4 illustrates a four-phase shift register utilizing storage networks in accordance with the present invention. The circuit design for the phase order increase from the three-phase of FIG. 1 to the four-phase of FIG. 4 is accomplished in accordance with techniques described in the aforementioned Dick application and in the mentioned "Intermag Proceedings." In establishing the corresponding relationship between the disclosures of those prior art references and the circuit of FIG. 4, the magnetic devices 38 through 45, inclusive, in FIG. 4 correspond to coupling devices in the references; and the coupling loop resistors 48 through 57, inclusive, correspond to storage cores in the references. After the higher phase order network has been derived as previously taught, and resistors substituted for storage cores, it will be seen that the remaining magnetic devices are all coupled to a single common wire. Straightening the wire produces the circuit of FIG. 4 herein in which the magnetic devices now act as storage devices.

Shift circuits D1 through D4 are simply indicated in FIG. 4. It is to be understood that they are connected to a drive signal source, such as the source 20 previously described, which provides drive signals of the same character illustrated in FIG. 3 but with an additional phase included.

In the circuit of FIG. 4 the source 10 is coupled to the output circuit 12 through a common wire 11 the same as in the previously described embodiment. Likewise $n-1$ resistive connections are also provided between the source 10 and the output circuit 12. In this embodiment the resistive connections comprise connections 60, 61, and 62 for the four-phase circuit. Each such connection includes, for the illustrated shift register, a plurality of resistors providing coupling loop current paths of equal resistance. Also the first resistor in each of such connection adjacent to the source 10 shunts a different number of the first $n-1$ magnetic devices coupled to the wire 11. The resistor 48 shunts devices 38 and 39, resistor 51 shunts devices 38, 39 and 40, and resistor 54 shunts device 38 only. Other resistors of the connections 60, 61, and 62 each shunt succeeding groups of $n-1$ magnetic devices with the last resistor of each connection shunting any remaining segment group having less than $n-1$ magnetic device segments.

The resistive connections 60 and 62 comprise the $n-2$ connections for the four-phase circuit which are coupled to a common circuit junction 63, and the source 10 applies input pulses between wire 11 and junction 63. Source 10 is then included in the shunts of resistors 48 and 54. Output circuit 12 is in FIG. 4 applied across the last magnetic device 45 in the device sequence between source 10 and output circuit 12. Similarly, if the output circuit should be a low impedance circuit it must be connected in series with the resistive coupling loop which shunts only the last element in order that it may not subject the output storage element to excessive resistive damping.

Initial information conditions are indicated by arrows on the devices 38 through 45 in FIG. 4 in the same fashion that they had been indicated in FIG. 1 and under the same condition, i.e., with the drive signal D2 being active. It can thus be seen that for the four-phase circuit illustrated in FIG. 4 each group of four magnetic devices stores three separate information bits. This circuit, therefore, is also characterized by the fact that it has a bit packing characteristic wherein $n$ storage devices store $n-1$ bits.

The operation of the four-phase shift register is essentially similar to that of the three-phase register insofar as the transfer of information from one device to an adjacent device is concerned. In the four-phase embodiment the previously mentioned rules, that a receiving device is damped by $n-1$ parallel-connected resistors and that there are $n-2$ coupling loops in which information transfer current flows, also apply. Thus, if it is assumed that the element 40 in FIG. 4 is the transmitting element and is driven to its hard direction by the drive signal D1, the device 41 is the receiving element; and the two coupling loops linking both the transmitting and the receiving elements are loops 64 and 65 which also include resistors 49 and 55. The magnitudes of the resistors in the resistive connections 60, 61, and 62 have the same types of limitations as were previously noted in connection with the circuit of FIG. 1. The parallel combination of resistors 49 and 55 in the transfer current loops must be small enough to permit adequate transfer current to flow in wire 11 between devices 40 and 41 so that complete tipping will be accomplished. In one embodiment a transfer current of 2 milliamperes was advantageously employed. Similarly, the $n-1$ resistors shunting the receiving device 41 and producing the damping effect thereon, e.g., the resistors 49, 52, and 55, must be large enough to avoid excessive damping. Also, they must be large enough to limit any currents flowing in buffer devices, e.g., 39 and 42, to levels which are inadequate to affect permanently the easy direction magnetization thereof.

Since the higher phase order circuit of FIG. 4 includes two information transfer coupling loops for each transfer instead of just one as was the case in FIG. 1, the resistors 49 through 55 can be twice as large as the corresponding single coupling loop resistors of the three-phase circuit without excessively limiting the total information transfer current. This change in the permissible magnitude of the resistors, which applies to all of the resistors in the resistive connections, has a beneficial damping effect because the damping presented is now a parallel combination of three resistors, each of which has twice the magnitude of the two damping resistors noted in the three-phase circuit. Consequently, the total damping effect is less and the time constant of the receiving magnetic device is also less than in the three-phase case. Accordingly, the four-phase shift register can be expected to operate at a higher bit rate than was the case for the three-phase circuit. This improvement in operating rate has been borne out in practice since the four-phase circuit of the type illustrated in FIG. 4 has been operated at bit rates of approximately 5 megacycles for the information bits supplied by source 10.

Figure 5:
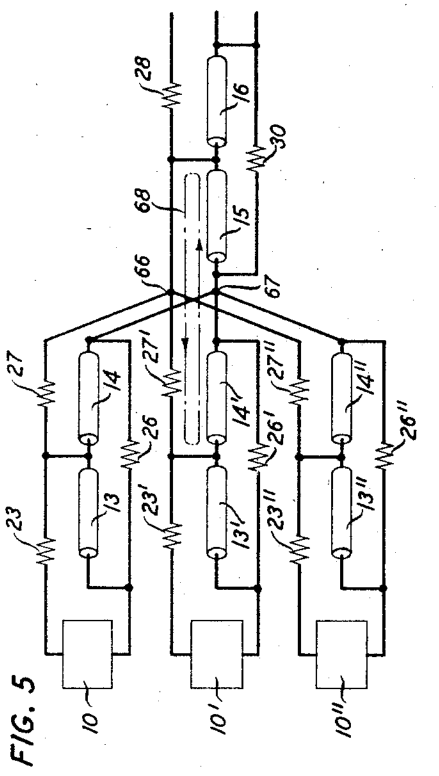
FIG. 5 is a circuit illustrating the application of information storage networks of the invention to the performance of a different type of logic function.

FIG. 5 illustrates one form in which the invention may be applied to the performance of logic. In this form, which is shown using the three-phase storage network embodiment, majority logic functions are accomplished. The three-phase format shown is similar to that utilized for storage networks in the shift register of FIG. 1, and corresponding reference characters are utilized in FIG. 5 to indicate the relationship. The circuit of FIG. 5 is arranged to determine the majority vote of three input sources 10, 10', and 10'', each of which may be of any desired type. The source 10 is coupled through two magnetic storage devices 13 and 14 and their associated three-phase resistor connections to a pair of fan-in circuit nodes 66 and 67. Similarly, the source 10', is coupled to the same nodes through devices 13' and 14', and the source 10'' is also coupled to those nodes through the circuits of devices 13'' and 14''. In order to simplify the drawing of FIG. 5, the drive straps 19 are not shown. However, in FIG. 5 it is to be understood that the drive straps are included, and drive signal D3 is thereby coupled to the devices 13, 13', and 13'' as well as the device 16. Similarly, the drive signal D1 is applied to devices 14, 14', and 14''; and drive D2 is applied to device 15.

During majority logic operation in the circuit of FIG. 5 signals from the three signal sources are shifted in the usual manner into the devices 14, 14', and 14''. Upon the next occurrence of the drive signal D1 all of the latter devices are driven to their hard direction of magnetization to produce information transfer loop currents having polarities which are indicative of the previous direction of easy magnetization in each of the 14-series devices. All of such currents at that time link the receiving device 15, and each such current links its respective transfer loop resistances 27, 27', or 27''. If all three of the devices thus supplying transfer current to the fan-in nodes 66 and 67 had been in the same magnetization state their total transfer loop current would be provided to the device 15 for tipping the same as the drive signal D2 is relaxed. However, if one of the devices 14, 14', or 14'' is in a different condition from the other two, two of the transfer loop currents tend to cancel one another; and the remaining transfer loop current represents the net current provided for tipping the magnetization in device 15. This single loop current is indicated in FIG. 5 by the broken-line loop 68 indicating that a majority of the devices providing transfer current to the fan-in nodes had been in the binary ONE condition.

The operation of the circuit of FIG. 5 is thus similar to the corresponding three-phase circuit in FIG. 1 except that in FIG. 5 the receiving device 15 is much more heavily damped than it was in the circuit of FIG. 1. In the latter figure the receiving device 15 saw a net damping resistance effect corresponding to $$\frac{R}{n-1}$$

where R represents the resistance of a single one of the resistors in any one of the resistance connections of the storage network. However, in FIG. 5 the receiving device 15 is damped by a resistance corresponding to $$\frac{R}{m+1}$$

where $m$ is equal to the number of circuits providing signals to the fan-in nodes. Thus, in FIG. 5 three input fan-in branches are provided and each has a transfer loop resistance corresponding to the resistor 27. In addition, the device 15 is further shunted by the resistor 30. The increased damping effect, which appears as the number of fan-in input circuits increases, increases the time constant of the receiving device so that its fall back time in response to the net tipping current is correspondingly larger than in the case of a single input storage network.

Four-phase majority logic connections can also be utilized for majority logic. The techniques for interconnecting input circuits to the fan-in nodes are much the same as illustrated in FIG. 5 but with the addition of another resistive circuit connection from each fan-in circuit to the second node on common wire 11 to the right of the fan-in node 67.

Fan-out can be accomplished by circuit arrangements which are actually the mirror image of those shown in FIG. 5 for fan-in. Thus, in the circuit of FIG. 5 if transfer signals were provided from the right-hand side of the circuit to the nodes 66 and 67, which would then be fan-out nodes, the transfer loop current must drive all of the output circuits to the left of those nodes. It has been found typically that a single magnetic device can produce a transfer loop current of approximately 15 milliamperes, whereas only about 2 milliamperes are required to produce adequate tipping in the receiving device. Consequently, it is not necessary to provide additional amplification at the fan-out point. It is to be noted, however, that in the fan-out situation when the magnetic storage device 15 is receiving information in the form of a tipping signal from the device 16, the device 15 is then heavily damped by the coupling loop resistors of the circuits to the left of the fan-out nodes. Consequently, the device 15 does at that time produce a higher damping current than in the single type of circuit illustrated in FIG. 1. Although there is less inherent signal gain through the fan-out nodes, fan-outs of three have been easily operated. It is thus seen that limits on the degree of fan-in or fan-out are imposed in the form of transfer signal magnitude restrictions.

Figure 6:
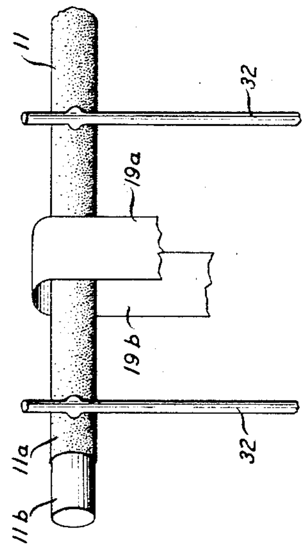
FIG. 6 is a partial diagram illustrating the circuit relationship of a magnetic storage element and its corresponding electric circuit connections in accordance with the invention.

FIG. 6 illustrates in much greater than life-size detail a single magnetic storage device and the electric and magnetic circuit connections thereto. Reference characters corresponding to those utilized in FIG. 1 are employed in FIG. 6 to illustrate the similarity. The wire 11 has the anisotropic magnetic plating 11*a* stripped back at the left-hand end thereof to reveal the substrate wire 11*b*. The drive strap 19 is centered between two of the tabs 32 and makes a single turn around the wire 11 with a portion 19*a* on top of the wire 11 and a portion 19*b* below the wire 11. Tabs 32 are advantageously welded to the wire 11 as indicated by the spread tab portions at the intersection with the wire in the drawing as previously noted. The tab wires have a much smaller diameter than does the wire 11 so that they may be flexed to accomplish connections to coupling resistor circuits without imposing mechanical strain upon the plating 11*a*. For example, tabs with a .002 inch diameter are employed for wire 11 having a .005 inch diameter. Such strain would, as is well known in the art, distort the magnetic characteristics of the plated film.

The width of the strap 19 is designed to be sufficiently narrow so that excessive drive currents are not required to achieve the desired switching of the film material on the wire 11 as hereinbefore outlined. However, the width of such straps is also proportioned with respect to the strap spacing from wire 11 so that the field is approximately $H_k$ at the strap edge but falls off rapidly beyond the edges of a strap, as previously noted. In one embodiment a value of about eight was employed satisfactorily for the ratio of strap width to spacing between strap portions 19*a* and 19*b*, and a strap width of .08 inch was advantageously employed.

The length of the segments of wire 11 between adjacent tabs 32 is established to provide a maximum bit capacity in a minimum of wire length while at the same time avoiding interference between adjacent bits. Thus, the length of wire 11 between adjacent tabs 32 exceeds the width of a strap 19 by a sufficient margin so that the tabs 32 are located at the edge of the region of wire 11 wherein flux is changed by signals in the strap 19. The spacing margin is also made large enough so that no part of the film plating 11*a* which may have been damaged by the welding of tabs 32 to the wire 11 is under the strap 19. Taking these various factors into consideration, a tab spacing of 0.2 inch is advantageously employed in storage network systems of the type hereinbefore described.

Figure 7:
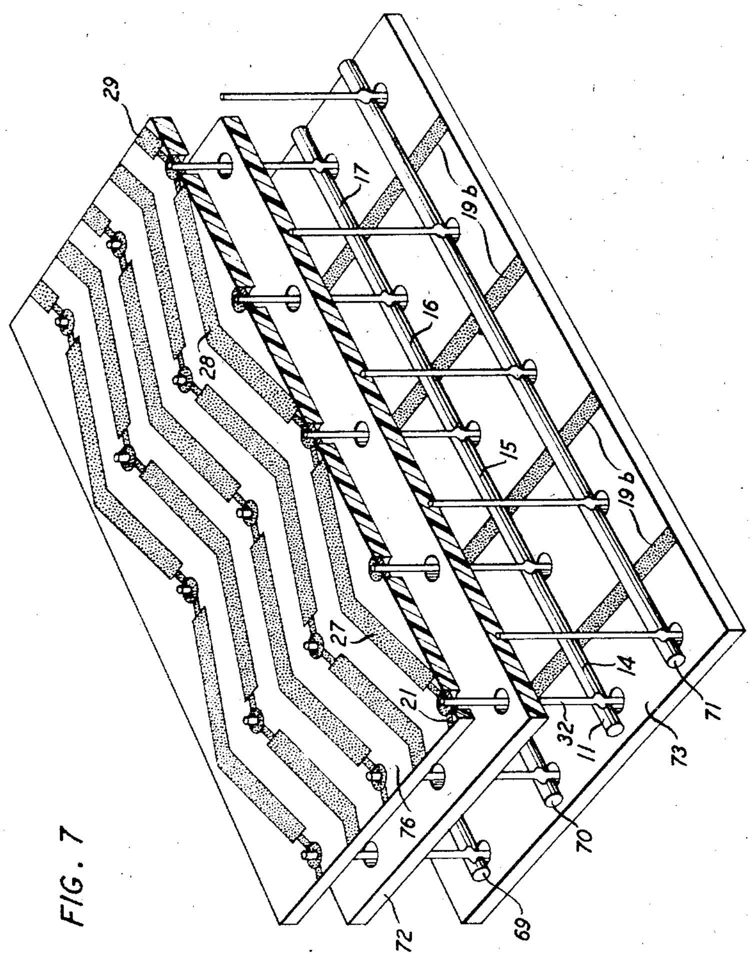
FIG. 7 is an exploded perspective diagram of a portion of an information storage network illustrating manufacturing techniques advantageously employed therein for a three-phase system.

FIG. 7 is an exploded perspective view of a portion of a three-phase system advantageously produced by batch manufacturing techniques including, for example, printed wiring techniques. The unit shown in FIG. 7 includes a part of the wire 11 of FIG. 1 as well as three additional wires 69, 70, and 71. However, any suitable number of such plated wires can be employed in a single circuit. The various wires may be interconnected in any desired fashion in separate circuits for each of the plated wires or interconnected circuits either in tandem or, for example, in some sort of fanning arrangement as illustrated in FIG. 5.

The segments of wire 11 corresponding to the devices 14 through 17 are indicated in FIG. 7. Two substrate boards 72 and 73 have the respective halves of drive straps 19 plated thereon. The drive strap portions 19*b* extending behind plated wire 11 can be seen in FIG. 7 on the top of the substrate board 73. The drive strap portions 19*a* are plated on the lower side of substrate board 72 and cannot be seen in FIG. 7. The two portions 19*a* and 19*b* of each drive strap are connected together at the rear of the assembly at points which are not visible in the drawing. Boards 72 and 73 are arranged to sandwich the plated wires with the drive straps running perpendicular to such wires and approximately midway between pairs of the tabs 32. Boards 72 and 73 are provided with apertures at each of the tab connection points in order to provide access for external connections at any stage along a shift register and to provide access to a further substrate board 76 whereon the coupling loop resistors are plated.

Spacing and securing means (not shown) hold the boards 72 and 73 close to the plated wires, e.g., wire 11, so that electromagnetic coupling to the plating on the wires is achieved. However, the boards are not permitted to contact the wires to avoid the imposition of any strain upon the films.

The board 76, which is also secured in the assembly with boards 72 and 73, has plated thereon parallel zigzag patterns of resistive material extending across the board 76 in the same direction as the plated wires 11 and 69 through 71. Within any single zigzag pattern the resistive material is limited to discrete segments having the correct resistance for a coupling resistor in a network of the type in FIG. 1. Thus, resistor portions in one such pattern which correspond to the resistors 27, 28, and 29 are indicated in FIG. 7. Such resistor portions on the board 76 are electrically interconnected in series within their respective zigzag patterns by metallic lands which are located at holes through the board 76 to permit the tabs 32 to extend therethrough. Such tabs are soldered to the corresponding lands to complete the coupling resistance connections for the information storage networks of the shift register as described in connection with FIG. 1.

The various zigzag patterns of resistive material are intermeshed on the board 76 so that the wire 11, for example, may follow the straight path shown and still permit alternate ones of the tabs 32 connected thereto to engage the lands of two different zigzag pattern connections, respectively. In FIG. 7 all of the tabs 32 which are connected to the wire 11 are soldered to their respective points of resistive connections 21 and 22, but significant portions of only the connection 21 are actually illustrated in FIG. 7 because portions of board 76 are broken away to display other structures of the unit.

Figure 8:
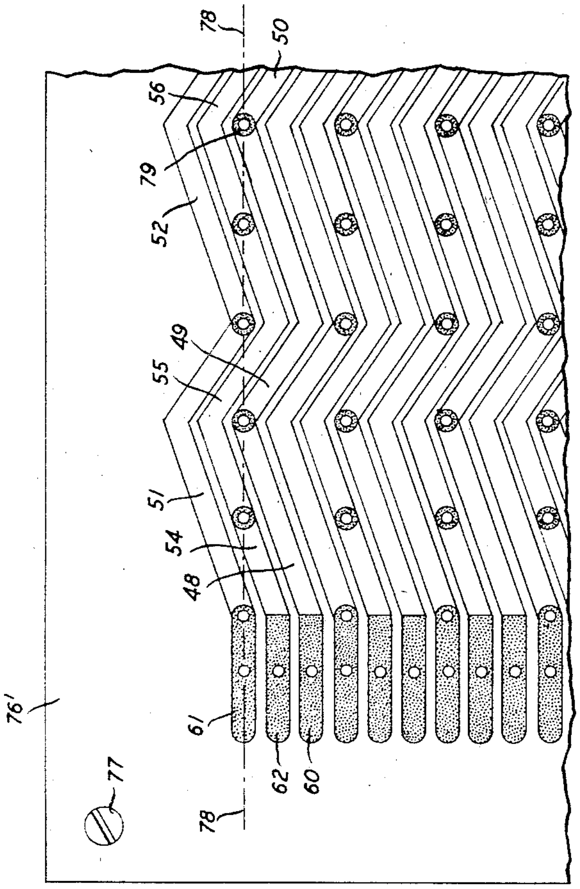
FIG. 8 illustrates a portion of a printed wiring board utilized for a four-phase system of the type represented by the drawing of FIG. 7.

FIG. 8 illustrates one corner of a substrate board 76' with intermeshed, resistive material, zigzag patterns printed thereon for a four-phase information storage system. The bolt head 77 in the upper left corner of the board indicates the securing means previously mentioned. The top three zigzag patterns are numbered to correspond to the resistor connections 60, 61, and 62 of the circuit in FIG. 4. The resistive portions of each such connection are also numbered to correspond to the resistors in the aforementioned resistive connections. It will be noted by comparing the zigzag patterns to a broken-line 78, which extends therethrough and corresponds to a plated wire such as the wire 11, that the patterns have a sawtooth configuration. Thus, the sweep portion of each pattern has a substantially smaller slope than does the retrace portion. This arrangement permits a plated wire following the straight path of the line 78 to have uniform tab spacing while still being interconnected to the three separate resistive connection patterns that are required for a four-phase system.

Thus, for example, a wire on the line 78 crosses the patterns of the resistive connections 60 through 62 in an alternating sequence which reading from left to right in FIG. 8, includes connections 61, 62, 60, 62, 61, 62, 60, et cetera. However, such wire with its uniform tab spacings is connected to the resistor circuit patterns at the circular lands such as land 79 in FIG. 8. Again reading from left to right, the same wire is connected to the resistive circuits in a recurring sequence of 61, 62, 60, 61, 62, 60, et cetera. In other words, at the pattern retrace portion the wire crosses, but is not connected to intermediate resistor connections, e.g., connection 62, of the recurring sequence.

Although the present invention has been described in connection with particular embodiments thereof, it is to be understood that additional embodiments and modifications which are obvious to those skilled in the art are included within the spirit and scope of the invention.

What is claimed is:

1. An information storage network comprising
a wire,
a plurality of segments of anisotropic magnetic material coupled to different portions of said wire, said material having an easy direction of magnetization and a hard direction of magnetization,
means supplying $n$-phase magnetomotive forces to different ones of said segments in a recurring sequence so that each of said segments is driven to its hard direction of magnetization once during each period of said signals and at substantially the same time that an adjacent one of said segments has a phase of said forces removed therefrom to permit it to fall back from its hard to its easy direction of magnetization, $n$ being at least 3,
$n-1$ resistor connections, each of said connections having connected in series therein a plurality of resistors, and
means connecting different ones of said resistors across different groups of $n-1$ of said segments so that each pair of adjacent portions of said wire is shunted by $n-2$ circuits each including one of said resistors.

2. The storage network in accordance with claim 1 in which
the resistor in each of said $n-2$ circuits is in a different one of said $n-1$ connections.

3. The storage network in accordance with claim 1 in which said supplying means comprises
a source of $n$-phase drive signals,
a plurality of drive straps each having approximately a single turn about a different one of said segments, and
each of said straps has a strap width adapted to produce a magnetization field in its corresponding segment in response to one of said drive signals, said field having in portions of said segment substantially coextensive with such strap a magnitude at least equal to the field required to drive said material to said hard direction of magnetization.

4. The storage network in accordance with claim 1 in which
a single one of said segments is included between each two adjacent points of connection of said connecting means to said wire, and
said adjacent points of connection are positioned substantially at the edge portions of the field of any of said magnetomotive forces that are applied to the one of said segments coupled between such points.

5. The information storage network in accordance with claim 1 in which
said plurality of segments includes at least one group of first, second, and third segments in the order named along said wire, and
said supplying means supplies a first one of said forces to said second segment and simultaneously removes another one of said forces from said third segment for shifting the easy direction magnetization state of said second segment to said third segment while said first segment inhibits the reverse propagation of said state along said wire.

6. The storage network in accordance with claim 5 in which
each of said plurality of resistors has a resistance magnitude proportioned to limit current through said wire portion to which said first segment is coupled to a level less than the level required for reversing the polarity of easy direction magnetization of said first segment, and
each of said plurality of resistors has a minimum magnitude such that $n-1$ of such resistors in parallel limit damping current induced upon the fall back of said third segment to a level such that the net currrent induced in said wire is adequate to set flux in said third segment.

7. The storage network in accordance with claim 1 in which
an output circuit is provided and has an input impedance substantially larger than the resistance of any of said different ones of said resistors, and
means couple said output circuit across one of said portions of said wire.

8. The storage network in accordance with claim 1 in which
an output circuit is provided and has a predetermined input impedance, and
means couple said output circuit in combination with one of said plurality of resistors, the resistance of said combination being substantially the same as the resistance of one of said different ones of said resistors.

9. The storage network in accordance with claim 1 in which
an output circuit is connected in series in one of said $n-1$ resistor connections, and
said output circuit includes a plurality of utilization circuits in parallel circuit combination.

10. The storage network in accordance with claim 1 in which
an input circuit is connected in series in one of said $n-1$ resistor connections, and
said input circuit includes a plurality of circuit means providing different signals in multiple to said one connection.

11. The storage network in accordance with claim 1 in which
a tipping current is induced in said wire in response to the driving of any one of said segments to its hard direction of magnetization, and
said tipping current is much smaller than the signal current provided by said supplying means but substantially larger than the current required to tip magnetization of one of said segments to a corresponding easy direction polarity at said time of removal of said magnetomotive force from the last-mentioned segment.

12. The storage network in accordance with claim 1 in which said $n$-phase signals are noncoincident with respect to one another in point of time.

13. The storage network in accordance with claim 1 in which
each of said different ones of said resistors has a resistance which is so proportioned that the total resistance of $n-2$ of such resistors in parallel limits the current induced in said wire in response to the driving of one of said adjacent segments to its hard direction of magnetization to a level that is at least adequate to tip the magnetization of another one of said adjacent segments to a condition of easy direction magnetization theretofore prevailing in said one of said adjacent segments.

14. The storage network in accordance with claim 1 in which
each of said plurality of resistors has a resistance magnitude proportioned to limit current through said wire portions to which segments, other than said adjacent segments, are coupled to a level less than the level required for reversing the polarity of easy direction magnetization of one of said segments.

15. The storage network in accordance with claim 1 in which
the resistance of each of said plurality of resistors has a magnitude proportioned so that damping imposed upon said adjacent segment by $n-1$ of such resistors in parallel is small enough to permit fall back of said adjacent segment from its hard magnetization to the same easy direction magnetization theretofore prevailing in an adjacent driven one of said segments.

16. The storage network in accordance with claim 1 in which an input circuit is provided for applying information signals to said network and comprises means applying information signals to such network between one end of said wire and a circuit junction, each of said resistor connections having as a first resistor therein the one which is electrically closest to said input circuit, said first resistors of said resistor connections each being connected to shunt a different number from 1 to $n-1$ of the first $n-1$ of said segments next to said input circuit, and each of said first resistors shunting less than $n-1$ of said segments having included in its connection said input circuit and said junction.

17. The storage network in accordance with claim 16 in which the frequency of forces applied by any one phase of said applying means is approximately the same as the rate of application of said information signals, and in any group of $n$ adjacent ones of said segments said forces are applied to such segments in a recurring sequence from the segment farthest from said input circuit to the segment nearest to said input circuit in order to shift said information signals through said group in the reverse of said sequence.

18. The storage network in accordance with claim 16 in which said input circuit includes a plurality of circuits for applying separate information signals between said junction and said wire, and the first one of said segments adjacent to said input circuit falls back to an easy magnetization polarity corresponding to the polarity of the net current supplied by all of said separate signals when said magnetomotive force is removed from such segment.

19. The storage network in accordance with claim 1 in which each of said segments comprises a magnetic storage device, and said segments are segments of a magnetic film coating on said wire.

20. The storage network in accordance with claim 19 in which said connecting means comprises a different tab wire at each connection between one of said resistors and said wire, and each of said tab wires has a diameter which is much smaller than the diameter of said coated wire so that such tab wire may be flexed without significantly straining said coating on said wire.

21. The storage network in accordance with claim 1 in which a substrate member is provided, each of said resistor connections comprises a plurality of series-connected bands of resistive material secured to said substrate member in a zigzag pattern extending in the direction of said wire, the patterns of all of said $n-1$ resistor connections being intermeshed so that said wire crosses said series-connected bands of said $n-1$ connections in an oscillating sequence of said $n-1$ connections, and said connecting means includes means connecting said wire to said bands in a recurring sequence of said $n-1$ connections at predetermined points of intersection of said wire with said patterns.

22. The storage network in accordance with claim 21 in which each of said zigzag patterns includes more than one pattern cycle, and each of said pattern cycles spans $n-1$ segments.

23. The storage network in accordance with claim 1 in which two substrate members are provided, said supplying means include a plurality of bands of conductive material secured to said substrate members in a parallel array of bands on each member, and said members are arranged on either side of said wire with said bands perpendicular to said wire.

24. The storage network in accordance with claim 23 in which a further substrate member is provided, each of said resistor connections comprises a plurality of series-connected bands of resistive material secured to said further substrate member in a zigzag pattern extending in the direction of said wire, the patterns of all of said $n-1$ resistor connections being intermeshed so that said wire crosses said series-connected bands of said $n-1$ connections in an oscillating sequence of said $n-1$ connections, said connecting means includes means connecting said wire to said bands in a recurring sequence of said $n-1$ connections at predetermined points of intersection of said wire with said patterns, and at least one of said two substrate members has apertures between said conductive material bands and through which said connecting means extend.

25. An information storage network comprising a plurality of magnetic storage devices each having a hard and an easy direction of magnetization, said plurality including at least one group of $n$ devices, $n-1$ devices of each said group resting in easy magnetization states wherein the polarities of the latter state represent $n-1$ individual information bits, respectively, a wire having a different group of $n$ adjacent portions thereof coupled to each of said groups of $n$ devices, a source of $n$-phase signals, respective portions of said signals representing each phase thereof being substantially noncoincident in point of time with the portion of any other phase portion, and means coupling each phase of said $n$-phase signals to a different one of said devices in each of said groups of said devices for driving such one device to its hard magnetization state during the corresponding phase of such signals to transfer an easy direction polarity state from said one device to an adjacent one of said $n-1$ devices.

References Cited

UNITED STATES PATENTS 3,387,290 6/1968 Snyder ---------- 340—174

BERNARD KONICK, *Primary Examiner.*

B. L. HALEY, *Assistant Examiner.*